United States Patent [19]
Koch et al.

[11] Patent Number: 5,487,555
[45] Date of Patent: Jan. 30, 1996

[54] HINGE CONNECTION BETWEEN TWO VEHICLES CONNECTED TO EACH OTHER IN AN ARTICULATED MANNER

[75] Inventors: Robert Koch, Bad Sooden-Allendorf; Knud Mosaner, Kassel; Roland Schleicher, Fuldatal, all of Germany

[73] Assignee: Hubner Gummi - und Kunstoff GmbH, Germany

[21] Appl. No.: 57,714

[22] Filed: May 4, 1993

[30] Foreign Application Priority Data

| May 7, 1992 | [DE] | Germany | 42 15 065.5 |
| Jun. 25, 1992 | [DE] | Germany | 42 20 777.0 |
| Aug. 17, 1992 | [DE] | Germany | 42 27 126.6 |

[51] Int. Cl.⁶ .................................................. B60D 1/50
[52] U.S. Cl. ................... 280/403; 105/3; 105/8.1; 105/18; 280/485; 280/486
[58] Field of Search .............................. 280/400, 402, 280/403, 424, 441.1, 483, 485, 486, 488, 489, 433, 476.1; 105/3, 4.1, 175.1, 392.5, 8.1, 15, 18

[56] References Cited

U.S. PATENT DOCUMENTS 2,843,417  7/1958  Wahl et al. .............................. 280/403

FOREIGN PATENT DOCUMENTS

| 1401470 | 4/1965 | France | 280/484 |
| 0966303 | 7/1957 | Germany | 280/403 |
| 1211075 | 2/1966 | Germany | 280/403 |
| 3208615 | 9/1983 | Germany | 280/486 |

*Primary Examiner*—Anne Marie Boehler
*Attorney, Agent, or Firm*—Levine & Mandelbaum

[57] ABSTRACT

Hinge connection between two vehicles, which are connected to each other in an articulated manner such that the two vehicles can be adjusted in relation to one another around a vertical axis, a transverse axis, and a longitudinal axis. Movements around the vertical axis are made possible within the hinge by one hinge part each being associated with one of the two vehicles and by both hinge parts being adjustable in relation to one another around the vertical axis. Movements around the transverse axis and around the longitudinal axis are made possible by one of the hinge parts being connected to one of the two vehicles adjustably around the transverse axis and the longitudinal axis. The hinge part that is connected to one of the two vehicles adjustably around the transverse axis and around the longitudinal axis is held rigidly at a rigid strap, which in turn is held at the corresponding vehicle (3) via an elastic element (4). The elastic element is able to undergo stretching strain and deformation by compression during relative movements between the two vehicles (1, 2) around the transverse axis and can be stressed by shear forces during relative movements between the two vehicles around the longitudinal axis (FIG. 1).

11 Claims, 4 Drawing Sheets

HINGE CONNECTION BETWEEN TWO VEHICLES CONNECTED TO EACH OTHER IN AN ARTICULATED MANNER

In articulated buses as well as rail cars and road vehicles of a similar design, it is currently common practice to provide the front car with one axle or group of axles at each end of the vehicle, the rear car with only one axle or group of axles at the rear end, and to pivot the rear car at its front end in a connecting hinge on the rear end of the front car. The connecting hinge is generally a fifth wheel connection, wherein one of the rings, mostly the inner ring, is associated with the front car; a second ring, mostly the outer ring, is associated with the rear car, and the outer ring is supported by the inner ring, and both rings are rotatable in relation to one another around a vertical axis in order to enable buckling movements of both parts of the vehicle around this vertical axis, which buckling movements are necessary for the vehicle to be able to travel in curves. To cross transverse waves in the road, both sectional vehicles must be able to perform pitching movements around a transverse axis. This is made possible by one of the two cars being connected to one of the two fifth wheel rings around transversely directed pin joints. The rear car is usually connected via such pin joints at the areas of the outer fifth wheel ring located opposite each other by 180° in the transverse direction of the vehicle, so that the horizontal pitch axis and the vertical buckling axis intersect in the center of the hinge at an angle of 90°. To enable rolling movements around the longitudinal axis of the vehicle between the two sectional vehicles, rubber sleeves are integrated within the pin joints.

This solution is generally considered to be functionally correct, reliable in operation, and feasible with reasonable manufacturing effort, and it is therefore currently a standard solution for articulated buses, regardless of whether the buckling movements are absorbed or controlled.

In other versions, the articulated vehicle consisting of a front car and a rear car is considered to be a torsionally rigid vehicle. The front car and the rear car cannot be twisted in relation to one another around the horizontal longitudinal axis of the vehicle, rolling movements between the sections of the vehicle are not provided for, and wheel grip is guaranteed only by the flexibility of the wheel springs when, e.g., one of the front wheels of the vehicle has its contact point with the pavement in a horizontal plane different from that of the rear wheel of the articulated vehicle that is diagonally opposite it.

Furthermore, a design of the above-mentioned pin joint is known, in which a thin-walled rubber sleeve is pressed in between the bearing eye associated with the rear car and the bearing pin associated with the outer ring of the fifth wheel connection, and the rubber sleeve is twisted around its longitudinal axis during pitching movements between the front car and the rear car, but has such a high compressive strength that it absorbs the forces which could cause rolling between the front car and the rear car without a substantial deformation by compression. It is common to the solutions discussed above that the buckling axis, pitching axis, and possibly also the rolling axis intersect in the center of the fifth wheel connection. Therefore, these prior-art solutions cause difficulties for the manufacturers of bellows, which are usually installed between the two sectional vehicles in order to include the transition area between the two sectional vehicles in the useful space of the vehicle. If a tunnel-shaped bellows, which is open at the bottom, is used, it is difficult to optimally shield the transition area against environmental effects. If, in contrast, the bellows is designed as an allround closed tube with a bottom located under the hinge to optimally shield the transition area against environmental effects, the necessity to take into account the pitching movements permits only a short distance between the bottom of the bellows and the pavement, which may lead to frequent damage to or premature wear of the bottom of the bellows. In a bellows that also has a middle frame besides the end frame for connection to the two vehicles or sectional vehicles, either in order to stabilize the bellows or in order to make it sectional, it is necessary, in addition, always to maintain the middle frame on the angle bisecting line regarding both the buckling and pitching movements between the two sectional vehicles in the case of the usual association with the hinge, which may require a considerable design effort, especially when the middle frame of the bellows is also to be associated with the hinge transversely displaceably in order to adjust the kinematics of the movements between the sectional vehicles and the kinematics of the movement of the bellows.

On a background of the above-described difficulties, which may occur when the buckling axis, the pitching axis, and possibly also the rolling axis intersect in the center of the fifth wheel connection, a prior-art solution was developed, in which the pitching axis is arranged at a certain distance in front of or behind the vertical pitching axis, and the pin joints defining the pitching axis are therefore offset in the longitudinal direction of the vehicle in relation to the center of the fifth wheel connection and are also located at a radially spaced location from the outer circumference of the fifth wheel connection.

Corresponding considerations also apply to a likewise prior-art solution for an articulated vehicle of the same class, in which the frames of the front car and of the rear car are elastically connected to the fifth wheel connection (EP 0 475 341 A1). However, this solution has the dual disadvantage of considerable manufacturing effort as a consequence of the two elastic connections, but mostly of the uncontrolled travel conditions, which may represent a considerable source of hazard, especially when unequal propelling forces act on the front car and the rear car, e.g., because an articulated bus is designed as a prismatic joint bus, whose driven axle is that of the rear car, or because an articulated bus with driven rear axle of the front car is traveling down a gradient and the front car is being braked more strongly than the rear car. A downwardly acting force may act on the rear of the front car, and an upwardly directed force may act on the front of the rear car under such travel conditions, and these forces cause the fifth wheel connection to perform a tilting movement around the horizontal transverse axis, and this movement may increase to the extent that the hinge connections may be even overloaded and be torn out.

The vehicle manufacturer is faced with this problem, because the great efforts increase the manufacturing cost of the articulated vehicle, and he is responsible for the safety of operation of the vehicle. The hinge manufacturer is faced with this problem, because he must manufacture his hinge with increased effort and consequently at a higher cost in light of this problem, and, finally, this problem is also faced by the bellows manufacturer, because he sees "his" bellows exposed to increased wear.

Consequently, the task of the present invention is to propose a solution, which makes possible a reliably operating hinge connection of simple design and low wear between the front car and the rear car of an articulated vehicle, especially an articulated bus suitable for city traffic.

This task is accomplished according to the present invention according to the patent claims.

The present invention will be explained below on the basis of the drawing. In the drawing.

The front car or the front sectional vehicle of an articulated bus is designated by 1, and only the rear end of this front sectional vehicle is shown schematically, and this front sectional vehicle is assumed to have an axle or group of axles at each of its ends.

Correspondingly, the front end of the rear car or sectional vehicle 2 is represented schematically. This rear sectional vehicle is assumed to be provided with an axle or group of axles or corresponding pairs of wheels per axle only at its rear end, i.e., at the end that is not shown.

Figures 1, 2:
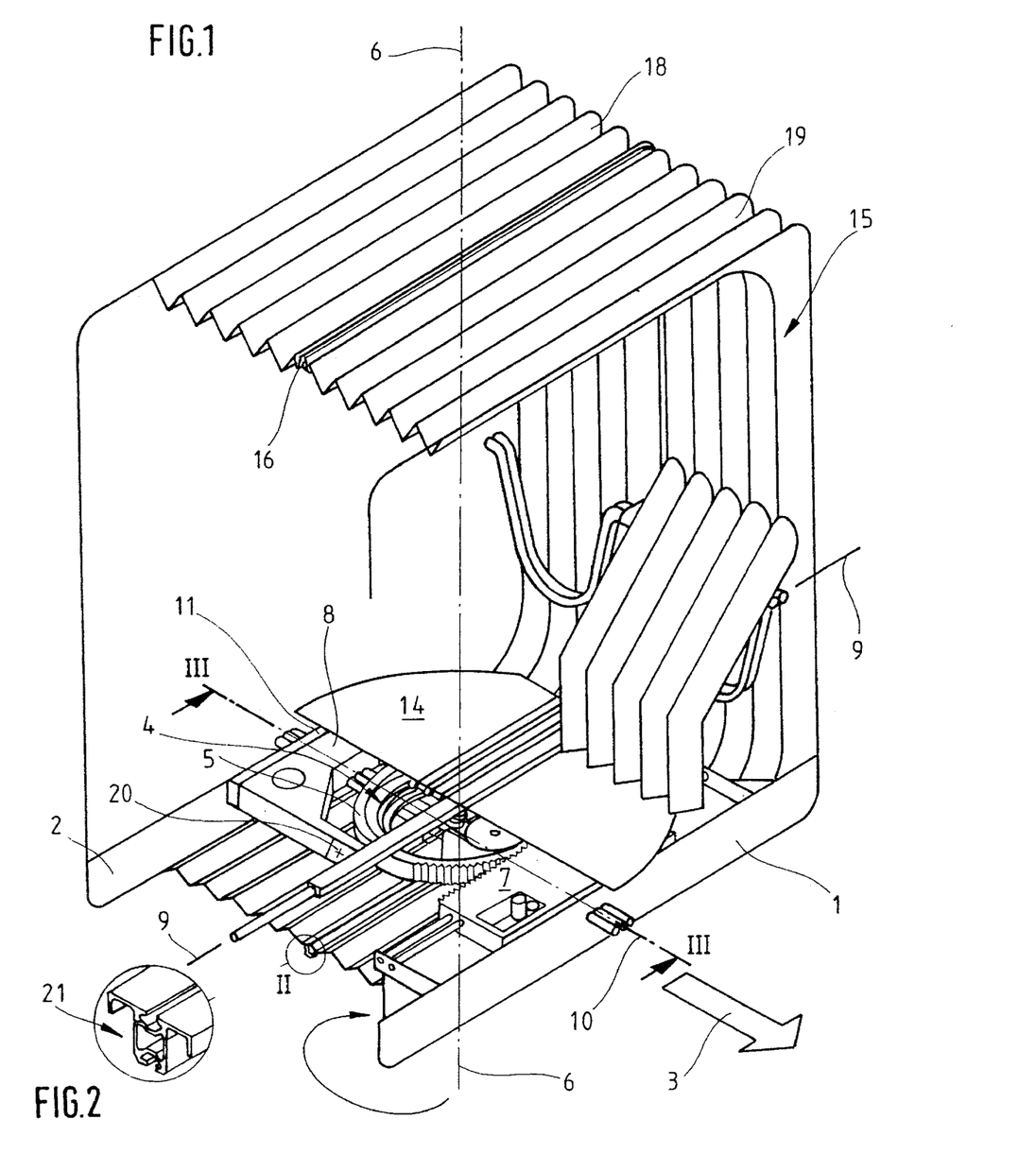
FIG. 1 shows a view into the transition area between the two sectional vehicles of an articulated bus with a hinge designed according to the present invention.
FIG. 2 shows the partial area designated by II in FIG. 1 on a larger scale.
Figure 3:
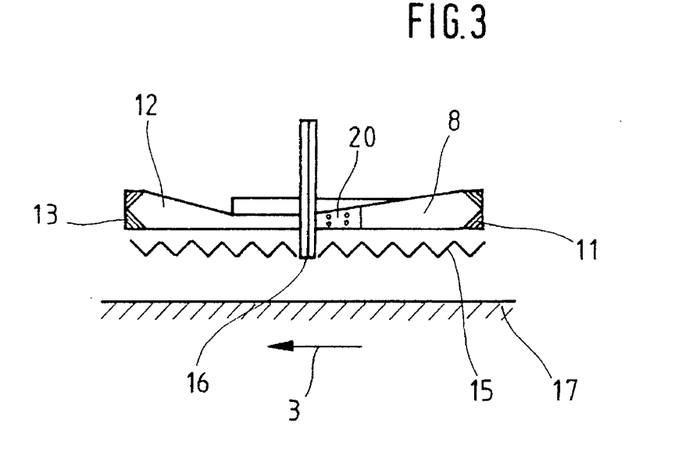
FIG. 3 shows a section along line III—III in FIG. 1.

The direction of travel of the articulated bus during normal forward travel is indicated by the arrow 3 in FIGS. 1 and 3. The drive of the entire articulated bus is preferably arranged in the rear sectional vehicle. It may act either on one of the axles or groups of axles of the front sectional vehicle, so that the entire articulated bus is "pulled," or it may act on the axle or group of axles of the rear sectional vehicle, so that the entire articulated bus is "pushed."

The two sectional vehicles 1, 2 are connected to one another in a low-platform fifth wheel hinge 4, whose outer and upper fifth wheel ring 5 is associated with the said rear sectional vehicle 2. The fifth wheel ring 5 is supported on the inner and lower fifth wheel ring 5' of the fifth wheel hinge 4 (FIG. 4), which is associated with the front sectional vehicle 1. The outer fifth wheel ring 5 and the inner fifth wheel ring 5' are rotatable in relation to one another around the vertical axis 6 by a buckling angle, so that the two sectional vehicles 1, 2 are able to perform buckling movements around the vertical axis 6 in relation to one another. These buckling movements are absorbed in the case of pulled buses, and they are controlled, including absorption, in the case of pushed articulated buses.

Thus, the usual conditions occur in terms of design and function, so that it is unnecessary to describe them in detail. The device for absorbing or controlling the buckling movements is therefore also designated only generally by the reference numeral 7 in this connection.

In hitherto conventional articulated buses, the inner or lower fifth wheel ring is placed on the undercarriage of the front sectional vehicle and is connected thereto, while horizontally outwardly directed pins, which are rotatably surrounded by bearing eyes at the ends of a fork-shaped crossbar 8, which in turn is rigidly associated with the undercarriage of the rear sectional vehicle 2, are associated with the outer fifth wheel ring 5 in two areas 20 that are diametrically opposite in the transverse direction of the vehicle. The common longitudinal axis 9 of the pins, which is directed in the transverse direction of the vehicle, is the pitching axis, around which the two sectional vehicles 1, 2 are able to pivot in relation to one another ("pitching movements") in the vertical direction in the case of the common hinge design. Rubber sleeves, which permit rolling movements between the two sectional vehicles, i.e., relative movements around the longitudinal axis 10 of the vehicle, may be arranged between the pins in the case of the common hinge design. Due to permanent association with pins and sleeves and a corresponding twistability, the rubber sleeves can also enable the pitching movements and they do not permit any rolling movements between the two sectional vehicles, or they may permit such rolling movements as a result of a corresponding deformability by compression.

The vertical axis 6, the transverse axis 9, and the longitudinal axis 10 intersect at least approximately in the center of the fifth wheel hinge 4.

Deviating from this hitherto common solution, the crossbar 8 is rigidly connected at both ends of its fork prongs to the outer fifth wheel ring 5 in the areas 20, namely, in areas in which the above-described pin joints are arranged in prior-art vehicles, i.e., symmetrically to the transverse axis 9. These are simple screw connections. On the other hand, the crossbar 8 is not connected rigidly to the undercarriage of the rear sectional vehicle 2 any more, but via a rubber element 11. The simplest solution for the rubber element is represented in FIG. 1 as a strip extending in parallel to the pitching axis, which is dimensioned such that it permits movements between the two sectional vehicles in the direction of the longitudinal axis 10 under relatively slight deformation by compression or shear deformation, pitching movements around an axis parallel to the axis 9 partly under deformation by compression and partly under stretching strain, and possibly rolling movements around the longitudinal axis 10 under shear deformation. However, according to FIG. 3, the "rubber element" preferably consists of two strips of triangular cross section, wherein the hypotenuses of the two strip cross sections form approximately a section of a cylinder, whose longitudinal axis is the transverse axis 9. Correspondingly, the inner or lower fifth wheel ring of the fifth wheel hinge 4 is not placed on the undercarriage of the front sectional vehicle 1 and is not attached rigidly thereto any more, as in the state of the art. The lower, inner fifth wheel ring is also placed, instead, on a crossbar 12 similar to the crossbar 8, and is rigidly connected to same, and the crossbar 12 in turn is mounted at the rear end of the front sectional vehicle via a rubber element 13 corresponding to the rubber element 11 (FIG. 3). However, it is definitely possible to rigidly connect the inner, lower fifth wheel ring 5' to the undercarriage of the front sectional vehicle 1 according to the state of the art. The pitching axis is displaced in this case in relation to the pitching axis 9 in FIG. 1 in the longitudinal direction of the vehicle. In the case of symmetrical design of the connection of the two fifth wheel rings 5, 5' at the respective sectional vehicle 1 or 2 according to FIG. 3, the pitching axis according to FIG. 1 remains in the center of the hinge.

The rubber element 11 according to FIG. 1, or the rubber element 11 according to FIG. 3, or the rubber elements 11, 13 according to FIG. 3 consist of an elastic material, for which rubber is selected only as a general designation. Its properties are determined such that tensile and compressive forces can be transmitted between the front and rear sectional vehicles in the direction of arrow 3 and opposite this direction. The two rubber elements also permit the necessary pitching movements between the two sectional vehicles. Finally, the rubber elements permit the necessary rolling movements between the two sectional vehicles 1, 2. Finally, buckling movements between the two sectional vehicles around the vertical axis 6 are made possible, just as according to the state of the art, by relative movements between the inner and outer fifth wheel rings of the fifth wheel hinge 4.

A preferred solution is one in which an elastic connection is provided in the above-described manner only between one of the sectional vehicles 1, 2 and the fifth wheel ring or fifth wheel of the fifth wheel hinge 4 associated with it. An even more preferred solution can be the modification of the solution shown in FIG. 1, according to which the crossbar 8 is rigidly attached to both the rear sectional vehicle 2 and the outer fifth wheel ring or said fifth wheel 5, and the inner fifth wheel ring or fifth wheel is connected to the front sectional vehicle 1 in the above-described manner.

If a transition bridge 14 is arranged in the usual manner in the area between the two sectional vehicles 1, 2, and if the transition area between the two sectional vehicles is surrounded by a bellows 15, which is attached with end frames to front sides of the two sectional vehicles, which front sides face each other, the following problem will arise. If the crossbar 8 is rigidly attached to the rear sectional vehicle 2 and is connected rotatably around the transverse axis 9 at the outer fifth wheel ring 5, a relatively great distance must be maintained between the fifth wheel hinge 4 and the bottom of the bellows in order to prevent the crossbar 8 from striking the bottom of the bellows during the pitching of the rear sectional vehicle 2 around the transverse axis 9 in relation to the front sectional vehicle 1 and the pivoting of the crossbar 8 around the transverse axis 9, which now takes place. The distance between the bottom of the bellows and the pavement 17 is correspondingly short, and the risk of frequent contacts between the bottom of the bellows and the pavement 17 is high. Experience has shown that the bottom of the bellows is worn long before the side walls and the roof of the bellows, and it must be replaced at a considerable expense.

If the inner ring 5' of the fifth wheel hinge 4 at the front sectional vehicle 1 and/or the outer ring 5 of the fifth wheel hinge 4 at the rear sectional vehicle is articulated via a respective rubber hinge 11 and 13 to the front or rear sectional vehicle, respectively, it is not necessary to take into account correspondingly large pivoting movements, the bottom of the bellows can be moved much closer to the fifth wheel hinge 4, and it can correspondingly be arranged at a greater distance from the pavement 17, and the risk of its premature destruction due to frequent contacts with the pavement is markedly diminished.

This advantage can be achieved when either the inner ring 5' of the fifth wheel hinge 4 is elastically connected to the front car 1 or the outer ring 5 of the fifth wheel hinge 4 is elastically connected to the rear car 2, and—compared with the solution according to which both the inner ring of the fifth wheel hinge 4 is elastically connected to the front car 1 and the outer ring 5 of the fifth wheel hinge 4 is elastically connected to the rear car 2—this solution offers the additional advantage of simple design and of a more accurately predictable behavior during travel, among other things, because two pitching axes (horizontal transverse axes, around which the sectional vehicles pitch in relation to one another when crossing, e.g., a transverse wave in the pavement) are defined by the two elastic elements 11, 13 in the second case (FIG. 3), while only one such pitching axis is defined in the first case.

The risk of premature destruction of the bottom of the bellows due to frequent contacts with the pavement is additionally reduced when, in another embodiment of the present invention, the bellows has a lower height in its bottom area than in its roof and side wall area.

The present invention offers the additional advantage of being simpler than prior-art solutions with pin joints in the areas 20 and of permitting a lower fifth wheel hinge. The simpler design arises from the circumstance that the rubber hinges 11, 13, and especially only one such rubber hinge between the crossbars 8, 12, specifically 8 or 12, on the one hand, and the two sectional vehicles 1, 2, specifically one of the sectional vehicles, on the other hand, are/is simpler than the pin joints between the crossbar 8 and the outer fifth wheel ring 5. The susceptibility to malfunction and the necessity of maintenance are also lower. The lower design of the fifth wheel hinge 4 arises from the fact that the pin joints require a higher outer fifth wheel ring 5 than the rigid connection 20 of the crossbar 8 at the outer ring 5 or an equivalent design. The weight of the device can be kept lower than in the prior-art arrangements with the pin joints.

Finally, another essential advantage is offered by the fact that a middle frame 16 can be associated with the bellows 15, and even though the middle frame can be associated with the fifth wheel hinge 4 transversely displaceably (in the direction of the pitching or transverse axis 9) in relation to the fifth wheel hinge 4 in the lower area, it can otherwise be associated with the fifth wheel hinge 4 at a fixed angle, and it is nevertheless always positioned corresponding to the bisecting line of the pitching angle; this can be achieved in the prior-art arrangements only with an expensive connecting rod guide. The middle frame 16 can be used exclusively to stabilize the bellows, which is a one-part bellows between its end frames, or also to connect two bellows halves 18, 19, each of which is associated, with its end frame, with one of the two sectional vehicles 1, 2 each.

If the two rubber hinges 11, 13 are used to absorb the pitch angle proportionately from the front rubber hinge 13 and from the rear rubber hinge 11, each rubber hinge has approximately the shape of a shell section, whose center line intersects the center of the fifth wheel hinge 4, and each rubber hinge 11 or 13 may be an elastomer element vulcanized in between two curved metal plates, or each rubber element may consist of strips of corresponding design and triangular cross section (as was mentioned above), which shows a solution of simpler design in this respect.

The middle strap 16 holds the bellows 15 at a safe distance from the pavement 17 in any travel situation, as the bisecting line of the buckling angle and as a bisecting line of the pitch angle due to its vertical centering, and always in a stress-free state relative to a lateral displacement due to a lower displacing guide 21 in relation to the fifth wheel hinge 4 that permits the buckling movements of the two sectional vehicles 1, 2. The displacing guide 21 consists of two parts 21a and 21b, which are telescopingly displaceable in relation to one another, and one of which, e.g., a guide bar 21a, is stationarily associated with the fifth wheel hinge 4, and the other part 21b is, e.g., the bottom crossbar of the bellows frame 16 (FIGS. 1 and 2).

Figure 4:
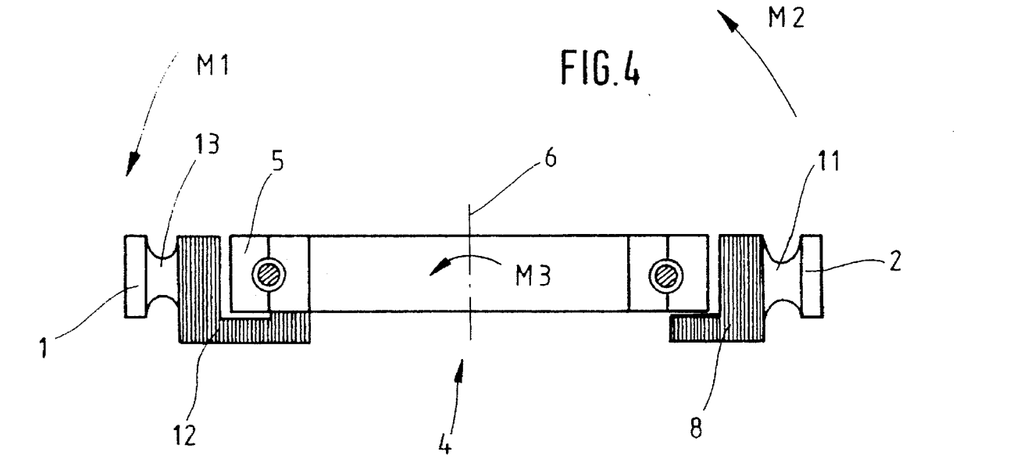
FIG. 4 shows a schematic representation of a hinge version for explaining a partial problem dealt with by the present invention.

If unequal drive torques occur on the two sectional vehicles, i.e., the front car and the rear car, in the above-described solution, and these torques are compensated only incompletely, because, e.g., the rear car pushes the front car during downhill travel in the case of an articulated vehicle with driven rear axle of the front car, and buckling stabilization is insufficient, moments of tilting torques M1 may develop in the rear of the front car, and they press down the rear of the front car, while torques M2 directed in the same direction, which press the front of the rear car upward, develop in the front area of the rear car (FIG. 4).

A pitching torque M3, by which the fifth wheel hinge is loaded in itself and in its connections, acts on the fifth wheel hinge, and there is a risk of destruction, and at least damage to the fifth wheel hinge and its connections. This risk occurs especially when both the rubber hinge 13 and the rubber hinge 11 are used.

This risk is met according to the present invention in two possible ways. According to one solution, the two elastic connections are maintained, but an appropriate control ensures that the torques M1 and M2 will act against each other and offset each other. The control may be a simple lever control. According to the other solution with only one of the elastic connections, in which only the outer ring of the fifth wheel hinge is connected to the rear car, or the inner ring of the fifth wheel hinge is connected to the front car via an elastic element ("rubber hinge") of the type described, the risk of development of such tilting torques is so low that a corresponding countermeasure can be omitted. This shows another essential advantage of the only one-sided elastic connection of the fifth wheel hinge 4 to the front car 1 or to the rear car 2 with the elastic element 11 or 13.

Figure 5:
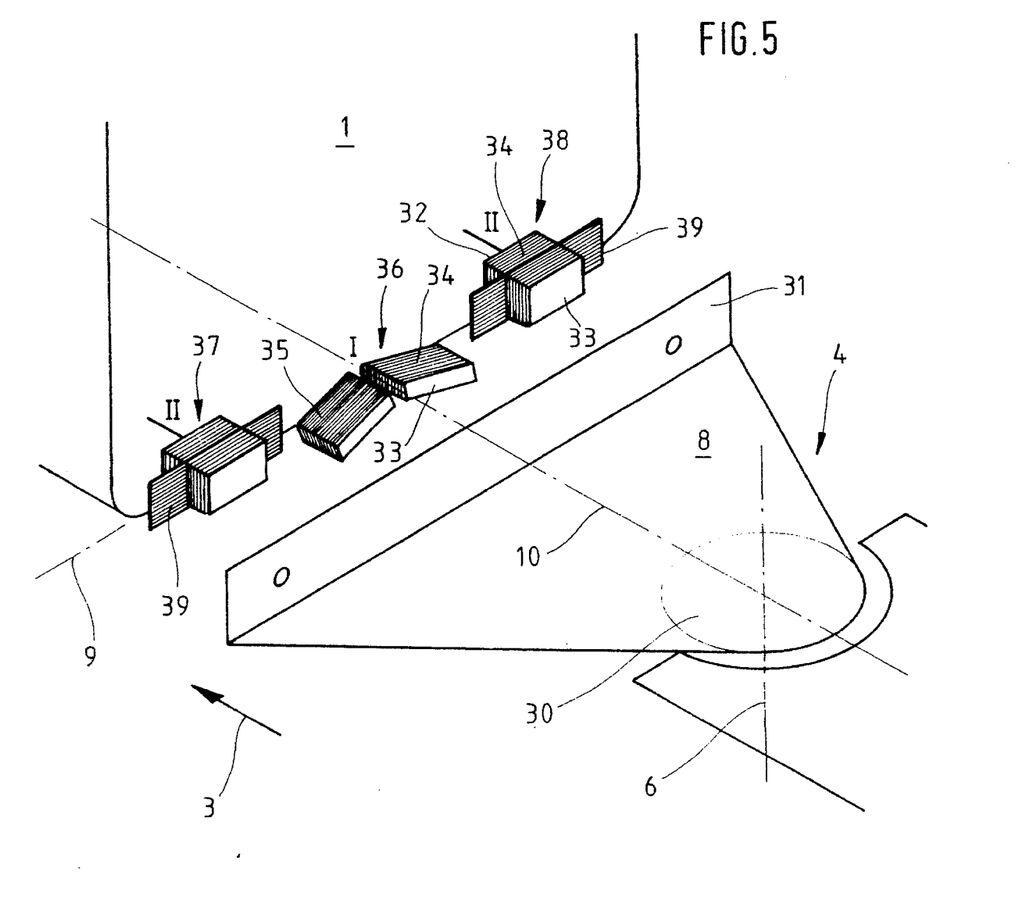
FIG. 5 shows a schematic perspective view of a hinge design considered to be particularly suitable, with only one-sided, elastic hinge design on one sectional vehicle, which is the front car.

To achieve the result according to FIG. 5, it is possible to apply the principle of a pair of connecting rods, of which each connecting rod is articulated at one of its ends to the front car 1 and at its other end to the rear car 2, and wherein the two connecting rods of the connecting rod pair cross each other between their ends in the horizontal transverse center plane of the fifth wheel hinge 4. The torque M3 is the sum of the torques M1 and M2 in the case shown in FIG. 4, and the torque M3 is the difference between the torques M1 and M2 in the case shown in FIG. 5.

A hinge connection, which is especially advantageous when only a one-sided elastic connection of the fifth wheel hinge is to be used at one of the two sectional vehicles, specifically, the elastic mounting of the fifth wheel hinge 4 at the front car 1 (FIG. 5), will be described below.

The vertical pivot axis is again designated by 6, the horizontal pitching axis extending in the transverse direction of the vehicle is designated by 9 in the area actually to be expected, and the horizontal rolling and vehicle longitudinal axis extending in the longitudinal direction of the vehicle is designated by 10. The arrow 3 indicates the direction of travel during usual forward travel. The inner ring of the fifth wheel hinge 4 is attached to a rigid horizontal plate 30, which in turn is located on the crossbeam 8, which ends, at the opposite end from the plate 30, i.e., at the end facing the front car 1, in a vertically arranged plate 31, namely, the front car connection.

The front car connection 31 is associated with the front car 1 via groups of metal-rubber-metal elements of basically identical design, wherein one of the metal-rubber-metal elements each has a rubber plate 32 in the known manner, which is fastened between two rigid plates 33, 34. The plates 33, 34 are preferably and usually metal plates, between which the rubber plate 32 is vulcanized, even though other materials and manners of fastening are also possible, and the designation "metal plate" is only a general designation.

Two of such metal-rubber-metal elements 35, 36 are arranged horizontally directly next to the vertical longitudinal center plane of the vehicle, in which the rolling axis 10 is located, and symmetrically to this axis. The lower metal plates of the metal-rubber-metal elements 35, 36 are supported on the front car 1, while the upper metal plates of the metal-rubber-metal elements 35, 36 support the rear car 2. Since the front car 1 has an axle or group of axles at each end, and the rear car has one only at the rear end, and the inner ring of the fifth wheel hinge 4 is held on the plate 30, and it is consequently associated with the front car 1, while the outer ring of the fifth wheel hinge 4 is associated with the rear car 2 and is supported on the inner ring, the vertical support forces of the rear car 2 are introduced into the front car 1 via the metal-rubber-metal elements 35, 36. The rubber plates of the metal-rubber-metal elements 35, 36 are subjected to compressive forces.

If the rubber plates of the metal-rubber-metal elements 35, 36 have a corresponding shear resistance, the metal-rubber-metal elements 35, 36 may also be arranged rotated by 90°.

The metal-rubber-metal elements 35, 36 may be associated with the front and rear cars in a functionally correct manner in any desired manner, so that such a solution will not be specifically shown.

Additional metal-rubber-metal elements 37, 38 are arranged to the side of the metal-rubber-metal elements 35, 36, but again symmetrically to the longitudinal center plane of the vehicle, closer or close to the vertical outer contour of the vehicle. However, while the metal-rubber-metal elements 35, 36 have mainly such a compression resistance that they are able to transmit the support forces of the rear car 2 onto the front car 1, the metal-rubber-metal elements 37, 38 have such a compression resistance in the longitudinal direction of the vehicle that they are able to transmit braking and driving forces between the two sectional vehicles 1, 2 without excessive relative movements in the longitudinal direction of the vehicle, and consequently they are arranged, functionally and perhaps even physically, rotated by 90° in relation to the metal-rubber-metal elements 35, 36. Thus, they have relatively low shear resistance in the vertical direction in order to hinder rolling movements between the two sectional vehicles around the rolling axis 10 as little as possible; this intended behavior is also supported by the arrangement of the metal-rubber-metal elements 37, 38 at a relatively far outside location.

To permit pitching movements between the two sectional vehicles 1, 2 within limits, but to reasonably limit the pitching paths, the metal-rubber-metal elements 37, 38 are divided by a rigid intermediate plate 39, or a metal-rubber-metal element 37, 38 is arranged on both sides of the intermediate plate 39, with the intermediate plate 39 as a single, common cover plate. The outer cover plates 33, 34 are now connected to the front car 1, while the intermediate plate 39 of both said metal-rubber-metal elements 37, 38 is connected to the rear car 2. The functionally correct connection may be performed in any desired manner in this case as well, so that no particular possibility will be shown.

Figure 6:
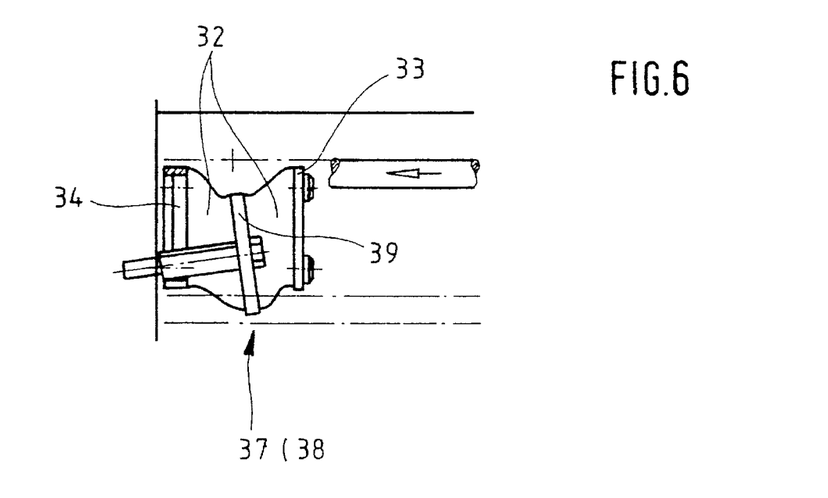
FIG. 6 shows a detail in a defined operating state.

During pitching movements between the two sectional vehicles 1, 2, the metal-rubber-metal elements 37, 38 undergo stretching strain and deformation by compression in the manner shown in FIG. 6 (in which the rubber plates of the metal-rubber-metal elements 37, 38 undergo deformation by compression during the transmission of shear forces and stretching strain during the transmission of tensile forces), so that a good possibility of pitching is accompanied by a good absorption characteristic of these movements.

Figure 7A:
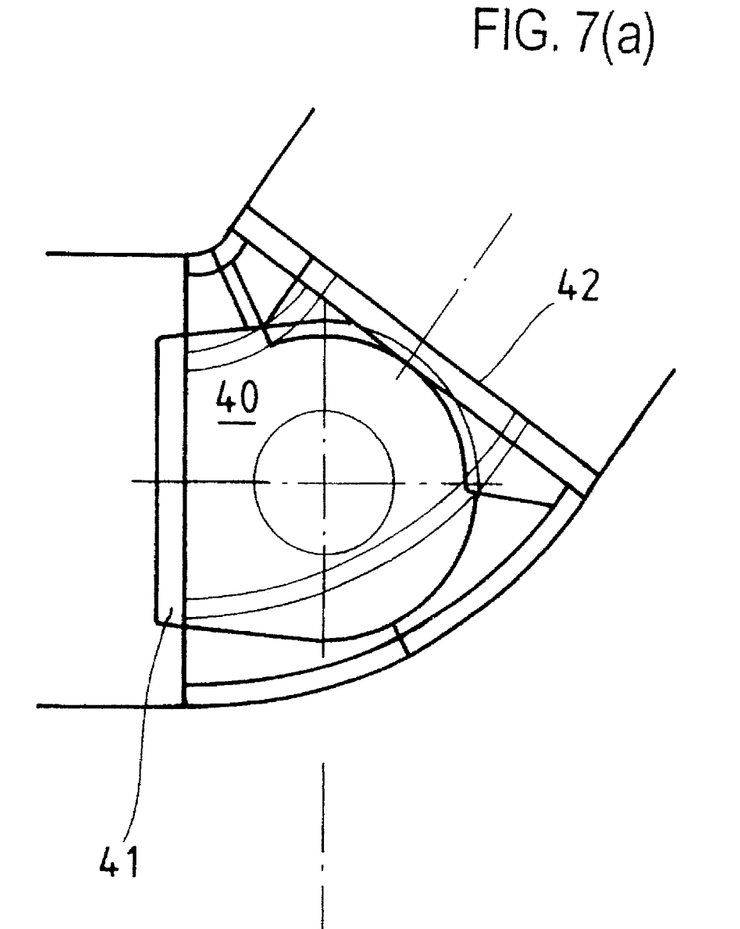
FIG. 7a and 7b show a possibility of a transition plate mounting, which is particularly advantageous in the case of the hinge design according to the present invention.
Figure 7B:
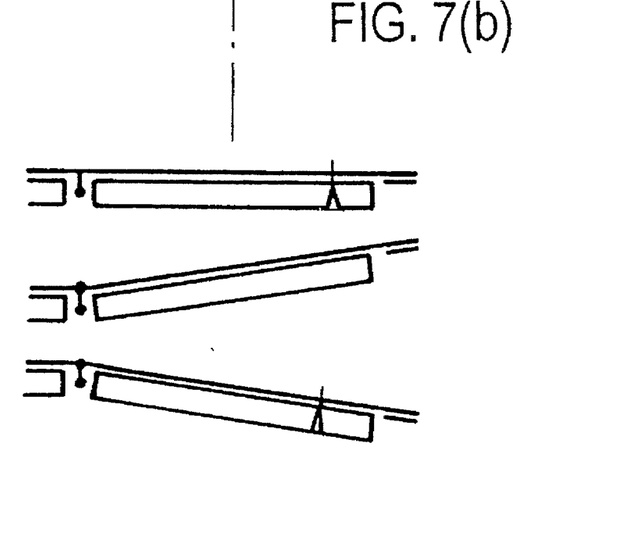

The design according to FIG. 7 with the FIG. Group (a) and (b) is proposed according to the present invention for the association of a transition plate 40 with the hinge connection.

A rubber plate 41 acts as a hinge between the transition plate 40 and one of the sectional vehicles, especially the front car, wherein the transition plate 40 is supported on the rear car 2 in a suitable, known manner such that horizontal pushing movements of the plate 40 in relation to the sectional vehicle 2 are possible. This arrangement offers the advantages of practically eliminating the need for maintenance, simple design, and the fact that all relative movements related to the operation are taken into account in the best possible manner. The rubber plate is compression resistant in the longitudinal direction of the vehicle, and has low compression resistance in the other directions.

It may be advantageous to arrange the metal-rubber-metal elements 35, 36 in the form of a gable roof such that the ridge of the "roof" is located in the vertical longitudinal center plane of the vehicle, and the metal-rubber-metal elements 35, 36 drop symmetrically on both sides from this ridge line. This solution could have functional advantages, because sufficient hardness is ensured against the bearing loads of the rear car, while even the metal-rubber-metal elements 35, 36 offer only little resistance at the same time to rolling movements, but installation space is created for functional lines under the "roof."

If the solution according to FIG. 7 is used in a fifth wheel hinge with three fifth wheel rings, the rail 42 is preferably associated with the third fifth wheel ring, which is arranged between the fifth wheel ring associated with the front car and with the rear car, rather than being directly associated with the rear vehicle.

We claim:

1. A hinge connection for connecting first and second articulated vehicles comprising fifth wheel ring means having an inner ring member and an outer ring member rotationally mounted thereon for relative pivotal movement about a vertical buckling axis, a base rigidly connected to one of said inner ring member and outer ring member, rigid connection means fixedly connected to the other of said inner ring member and outer ring member for rigidly connecting said other ring member to one of said first and second articulated vehicles, and elastomeric connection means mounted on said base outside of the circumference of said outer ring member for flexibly connecting said base to the other of said first and second articulated vehicles, said elastomeric connection means comprising a first plurality of elastomeric members whereby the pitch axis of said vehicles is displaced off center to a position between the outer circumference of said outer ring member and said other vehicle, at least one of said elastomeric members having a rubber component disposed in between two metal components, said metal components being spaced in the longitudinal direction.

2. A hinge connection for connecting first and second articulated vehicles comprising fifth wheel ring means having an inner ring member and an outer ring member rotationally mounted thereon for relative pivotal movement about a vertical buckling axis, a base rigidly connected to one of said inner ring member and outer ring member, rigid connection means fixedly connected to the other of said inner ring member and outer ring member for rigidly connecting said other ring member to one of said first and second articulated vehicles, and elastomeric connection means mounted on said base outside of the circumference of said outer ring member for flexibly connecting said base to the other of said first and second articulated vehicles, said elastomeric connection means comprising a first plurality of elastomeric members whereby the pitch axis of said vehicles is displaced off center to a position between the outer circumference of said outer ring member and said other vehicle, said first plurality of elastomeric members comprising one elastic member disposed symmetrically to the vertical longitudinal center plane of one of said first and second vehicles and a second plurality of elastomeric members disposed symmetrically to the vertical longitudinal center plane of said one of said first and second vehicles and spaced from the elastomeric members of said first plurality.

3. A hinge connection for connecting first and second articulated vehicles in accordance with claim 2 wherein at least one of said elastomeric members of said second plurality has a rubber component disposed in between two metal components.

4. A hinge connection for connecting first and second articulated vehicles in accordance with claim 3 wherein said one of said elastomeric members of said second plurality is disposed at an angle of ninety degrees with respect to said one of said elastomeric members of said first plurality.

5. A hinge connection for connecting first and second articulated vehicles comprising fifth wheel ring means having an inner ring member and an outer ring member rotationally mounted thereon for relative pivotal movement about a vertical buckling axis, a base rigidly connected to one of said inner ring member and outer ring member, rigid connection means fixedly connected to the other of said inner ring member and outer ring member for rigidly connecting said other ring member to one of said first and second articulated vehicles, and elastomeric connection means mounted on said base outside of the circumference of said outer ring member for flexibly connecting said base to the other of said first and second articulated vehicles, said elastomeric connection means comprising a first plurality of elastomeric members whereby the pitch axis of said vehicles is displaced off center to a position between the outer circumference of said outer ring member and said other vehicle, at least one of said elastomeric members having a rubber component disposed in between two metal components, said one elastomeric member further comprising intermediate plate means intersecting said rubber component between said metal components, one of said metal components being operatively connected to said first vehicle and said intermediate plate means being operatively connected to said second vehicle.

6. An articulated bus comprising a first vehicle, a second vehicle, and a hinge connection mounted on said first vehicle and said second vehicle, said hinge connection including fifth wheel ring means having an inner ring member and an outer ring member rotationally mounted thereon for relative pivotal movement about a vertical buckling axis, fork means having a base and two extending spaced arms rigidly connected to one of said inner ring member and outer ring member, rigidly connection means fixedly connected to the other of said inner ring member and outer ring member for rigidly connecting said other ring member to one of said first vehicle and said second vehicle, and elastomeric connection means mounted on the base of said fork means outside of the circumference of said outer ring member for flexibly connecting said fork means to the other of said first vehicle and said second vehicle, whereby the pitch axis of said vehicles is displaced off center to a position between the outer circumference of said outer ring member and said other vehicle, and bellows means connected between said first and second vehicles, said ring connection being disposed above the bottom of said bellows, said bellows comprising frame means supporting said bellows about the center of its length, said frame means being operatively connected to said fork means.

7. An articulated bus comprising a first vehicle, a second vehicle, and a hinge connection mounted on said first vehicle and said second vehicle, said hinge connection including fifth wheel ring means having an inner ring member and an outer ring member rotationally mounted thereon for relative pivotal movement about a vertical buckling axis, fork means having a base and two extending spaced arms rigidly connected to one of said inner ring member and outer ring member, rigid connection means fixedly connected to the other of said inner ring member and outer ring member for rigidly connecting said other ring member to one of said first vehicle and said second vehicle, elastomeric connection means mounted on the base of said fork means outside of the circumference of said outer ring member for flexibly connecting said fork means to the other of said first vehicle and said second vehicle, whereby the pitch axis of said vehicles is displaced off center to a position between the outer circumference of said outer ring member and said other vehicle, and bellows means connected between said first and second vehicles, said hinge connection being disposed above the bottom of said bellows, the height of the folds in said bellows being less in the bottom of said bellows than in the sides and top thereof.

8. An articulated bus comprising a first vehicle, a second vehicle, and a hinge connection mounted on said first vehicle and said second vehicle, said hinge connection including fifth wheel ring means having an inner ring member and an outer ring member rotationally mounted thereon for relative pivotal movement about a vertical buckling axis, fork means having a base and two extending spaced arms rigidly connected to one of said inner ring member and outer ring member, rigid connection means fixedly connected to the other of said inner ring member and outer ring member for rigidly connecting said other ring member to one of said first vehicle and said second vehicle, elastomeric connection means mounted on the base of said fork means outside of the circumference of said outer ring member for flexibly connecting said fork means to the other of said first vehicle and said second vehicle, whereby the pitch axis of said vehicles is displaced off center to a position between the outer circumference of said outer ring member and said other vehicle, and transition plate means operatively connected between said elastomeric connection means and one of said vehicles, said transition plate means being mounted to one of said vehicles for pivoting in a vertical plane, and overlapping the other of said two vehicles.

9. An articulated bus in accordance with claim 8 wherein said transition plate means is mounted on said second vehicle.

10. An articulated bus in accordance with claim 9 wherein said transition plate means is articulated with respect to said second vehicle.

11. An articulated bus in accordance with claim 8 wherein said transition plate means further comprises rubber bearing means deformable by compression in the longitudinal direction of said vehicles and by shear in the transverse and vertical directions, said rubber bearing means being operatively connected to one of said vehicles.

* * * * *